United States Patent [19]

Nielsen

[11] Patent Number: 5,314,047
[45] Date of Patent: May 24, 1994

[54] CABLE GUIDE FOR HOISTING DEVICES

[75] Inventor: Erik Nielsen, Köpenhamn, Denmark

[73] Assignee: Bromma Conquip AB, Vallingby, Sweden

[21] Appl. No.: 977,393

[22] PCT Filed: Sep. 26, 1990

[86] PCT No.: PCT/SE90/00616

§ 371 Date: Mar. 2, 1993

§ 102(e) Date: Mar. 2, 1993

[87] PCT Pub. No.: WO92/05102

PCT Pub. Date: Apr. 2, 1992

[51] Int. Cl.[5] ............................................. H02G 11/00
[52] U.S. Cl. ................................. 191/12 R; 174/70 R; 414/918; 138/110
[58] Field of Search .............. 191/1 R, 12 R; 138/106, 138/107, 110; 174/70 R, 135; 414/918

[56] References Cited

U.S. PATENT DOCUMENTS

| | | | |
|---|---|---|---|
| 3,289,983 | 12/1966 | Mennerdahl | 191/12 R |
| 3,802,351 | 4/1974 | Pascuzzi | 191/12 R X |
| 3,868,826 | 3/1975 | Landers | 138/110 X |
| 3,904,840 | 9/1975 | Kostelnicek | 191/12 R |
| 4,078,769 | 3/1978 | Wamfler | 191/12 R X |
| 4,570,866 | 2/1986 | Drower | 191/12 R X |
| 4,625,631 | 12/1986 | Vera | 138/107 X |

FOREIGN PATENT DOCUMENTS

| | | |
|---|---|---|
| 820169 | 8/1951 | Fed. Rep. of Germany . |
| 2249902 | 12/1974 | Fed. Rep. of Germany . |
| 465568 | 11/1990 | Sweden . |
| 609159 | 10/1978 | U.S.S.R. . |
| 831386 | 3/1960 | United Kingdom ............. 191/12 R |
| 905674 | 9/1962 | United Kingdom ............. 191/12 R |

*Primary Examiner*—Frank E. Werner
*Assistant Examiner*—Scott L. Lowe
*Attorney, Agent, or Firm*—Young & Thompson

[57] ABSTRACT

The present invention relates briefly to an arrangement for hoisting devices to keep a cable (10) substantially vertically stretched between a derrick or the like and a hoisting device, e.g. a derrick bridle (1), so that the cable will not be able to be depositioned by gusts and other factors. The arrangement includes a set of brackets (12) stretched between and glidably fixed to two opposed hoisting cords (2a, 4a), each bracket (12) being equipped with a ring (13) approximately center, through which ring the cable (10) runs with an increasing inner diameter for each ring (13) from the top downwards. To the cable (10) are fastened a set of elements (14) spaced apart with increasing diameter for each element from the top downwards for each inner diameter of the rings (13) so that each element (14) one by one is restricted to pass a corresponding ring (13) and thereby each hoists one by one a bracket (12) holding the cable (10).

6 Claims, 3 Drawing Sheets

CABLE GUIDE FOR HOISTING DEVICES

BACKGROUND OF THE INVENTION

1. Field of the Invention

The present invention relates to hoisting devices and especially to a cable guide keeping a cable stretched between the derrick itself and the hoisting accessories being supported by the crane by means of cords so as not to be effected and dislocated, especially by gusts.

2. Description of the Prior Art

In lifting load carrying bins, such as containers, special hoisting accessories are used, e.g. a derrick, bridle, supported by hoisting cables from a derrick or the like, is equipped with gripping elements to grip a container and during movement to retain it to the derrick bridle. The derrick bridle generally being adjustable to different container sizes has gripping elements for retaining the containers, the elements being equipped with electromechanic and/or hydraulic components. Independent of the type of guiding devices being used a supply line for current to the derrick itself is necessary and so are lines for transmitting signals from different sensors of the derrick bridle to the operator cabin giving the derrick operator the possibility of informing himself of the operation position of the bridle.

Although the invention is described in connection with a derrick bridle, as known to those skilled in the art, it can be adapted to many different types of hoisting devices.

The derrick bridle and its load is very heavy and will not be especially affected by winds. So is the case with the cable which is generally stretched between the derrick or the like and the derrick bridle over a distance of up to 30 to 40 m. The cable comprising a variety of different conductors, however, has a comparatively large diameter and so catches a great deal of wind. There does not need to be a particularly strong wind to affect the cable being and to push it sidewise out of the vertical of its normal position since such cable has comparatively little weight. This means that derricks today often are forced to stop operation at rather moderate wind forces not because the wind affects the load per se, but because the risk is rather large that such a cable might be pushed aside by the wind and hook on other objects or by other means be affected by stresses causing it to break or to damage objects.

There have been many different attempts to solve the problem of a cable being affected by winds. For example, it has been tried to increase the weight of the cable by attaching chains to it and to keep it stretched by means of various windlasses. None of these attempts have, however, been successful, the cable in these cases being strained at its sockets and being exposed to rupture. The application of windlasses is a very expensive procedure for keeping such heavy elements as cables stretched.

The present invention aims to overcome these problems mentioned above. The problem is solved with an arrangement according to the claims characterizing the invention.

BRIEF DESCRIPTION OF THE DRAWINGS

The invention is described in more detail in the following drawings, where.

DESCRIPTION OF THE PREFERRED EMBODIMENT

Figure 1:
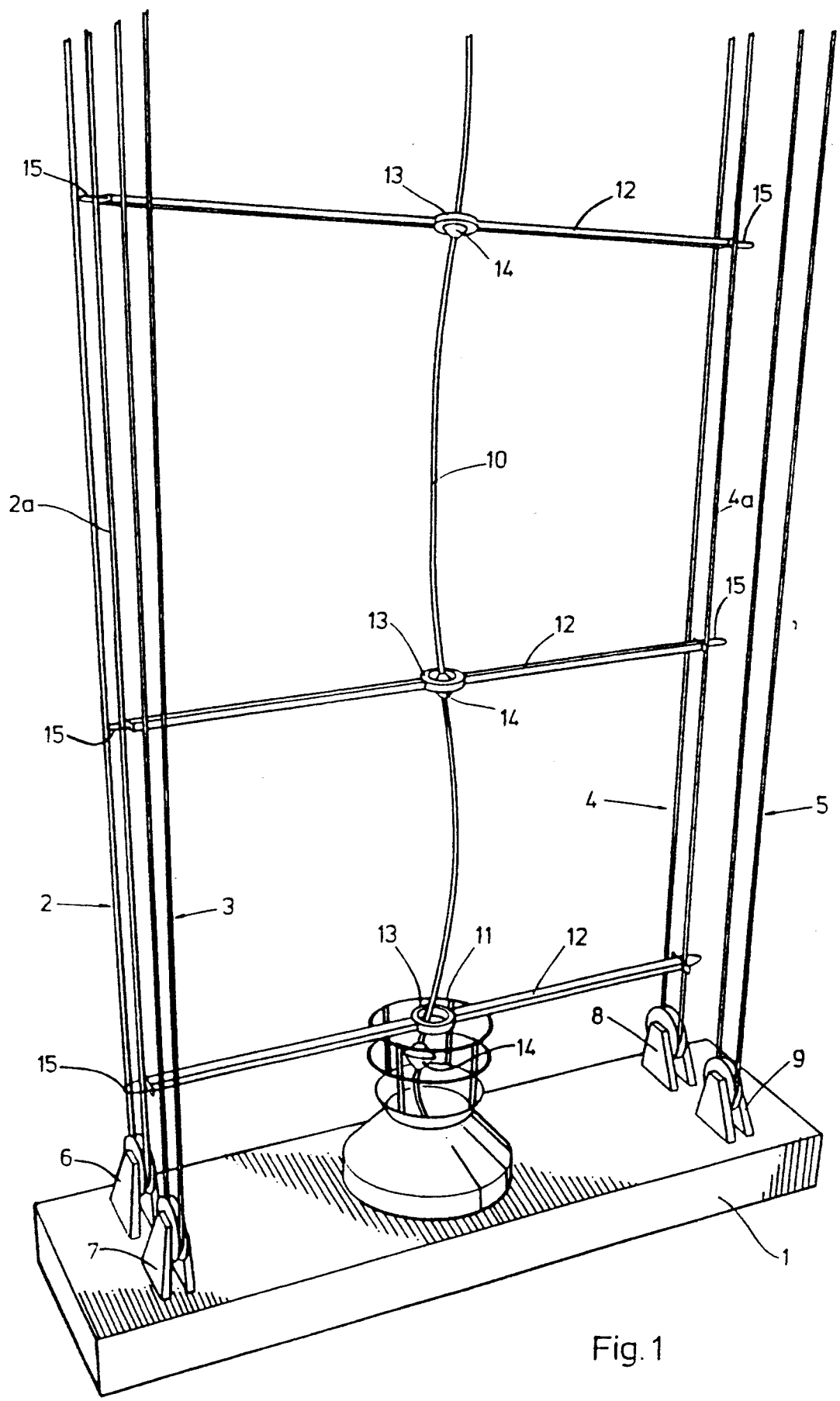
FIG. 1 shows schematically a perspective view partly in section of a derrick bridle suspension with a cable guide according to the invention.

In FIG. 1 there is schematically shown a derrick bridle 1 of a derrick (not shown), the bridle being suspended by four pairs of cords 2-5, the cords running over pulley arrangements 6-9. A cable 10 for transmitting electricity to the various operation units of the derrick bridle 1 as well as transmitting pilot, regulation and control signals extends from the derrick (not shown) down to the derrick bridle 1 where it is collected in and lifted out of a basket on top of the derrick bridle 1 respectively, depending on whether the derrick bridle is hoisted or lowered. In all these respects the execution is quite conventional.

Brackets 12 extending between opposed cords 2a, 4a are fastened to these cords in a way so that the cords 2a, 4a at the far-off ends of the brackets 12 pass freely through eyes 15. The brackets 12 have a ring 13 approximately in their centre, through which the cable 10 runs, the cable 10 comporting equally distanced spherical elements 14 which cannot penetrate any of the rings 13 with a result to be described further on.

Figure 2:
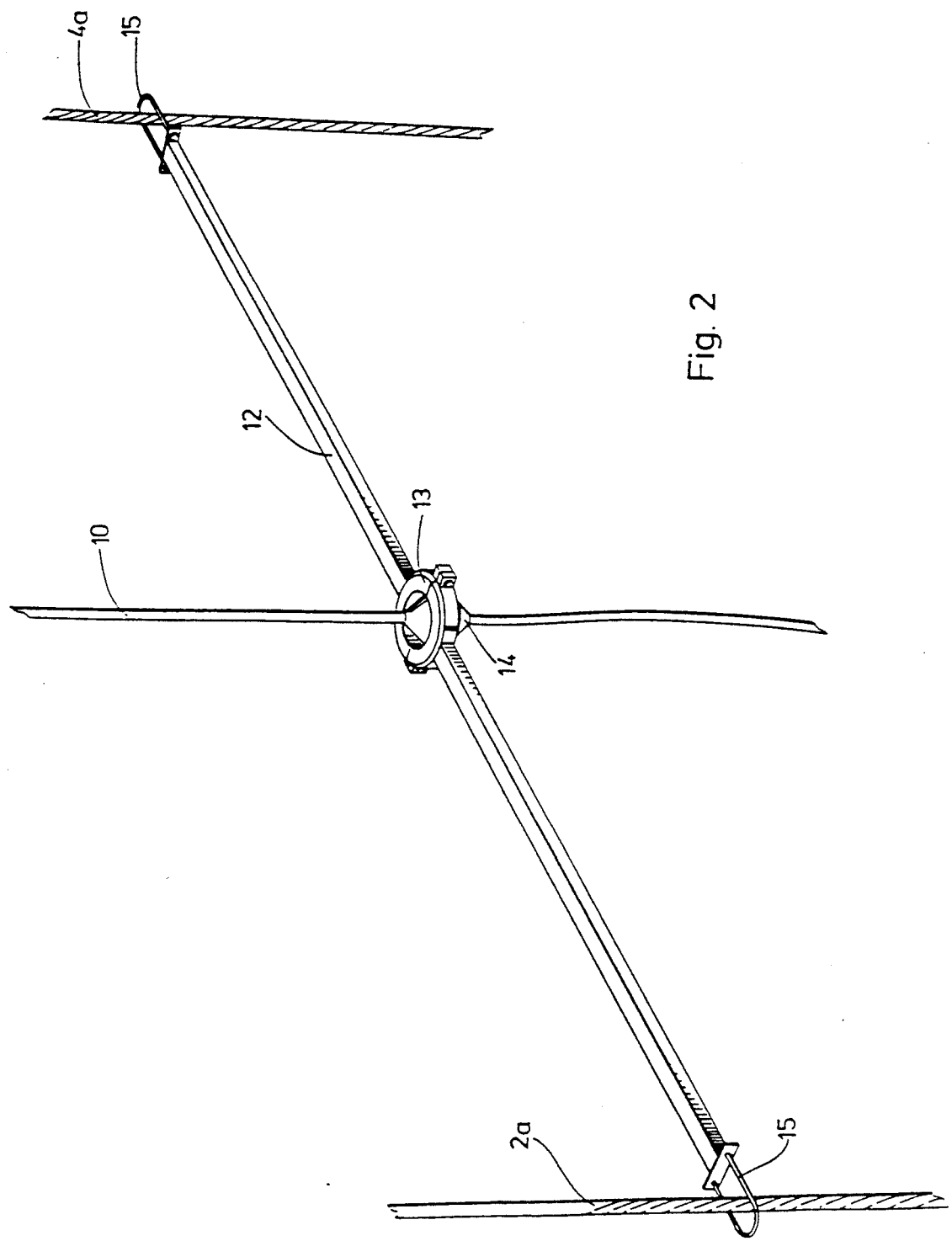
FIG. 2 shows a perspective view partly broken away of a guiding element in operation.

FIG. 2 shows a cable guide according to the invention. The guide consists of a bracket 12 extending between two lifting cords 2a and 4a respectively and comporting a ring 13 approximately in the centre, through which the cable 10 is running. At the far-off ends of the bracket 12 eyes 15 are situated, through which the lifting cords 2a and 4a respectively run. The eyes 15 are shown as clamps being screwed to the respective faroff ends of the bracket 12. However, it is evident that these eyes can have any construction whatsoever, eyes 15 keeping the bracket 12 stretched between the two cords 2a, 4a in a substantially horizontal position without being engaged in the movement of the cords. An element 14 formed as a double cone, a sphere or any suitable form is fastened on the cable 10 and is of such a size so as not to pass through the ring 13. This means that the element 14 is engaged by the ring 13 when the cable 10 is hoisted, i.e. the derrick bridle is lowered, and thus the bracket guiding the cable is hoisted.

Figure 3:
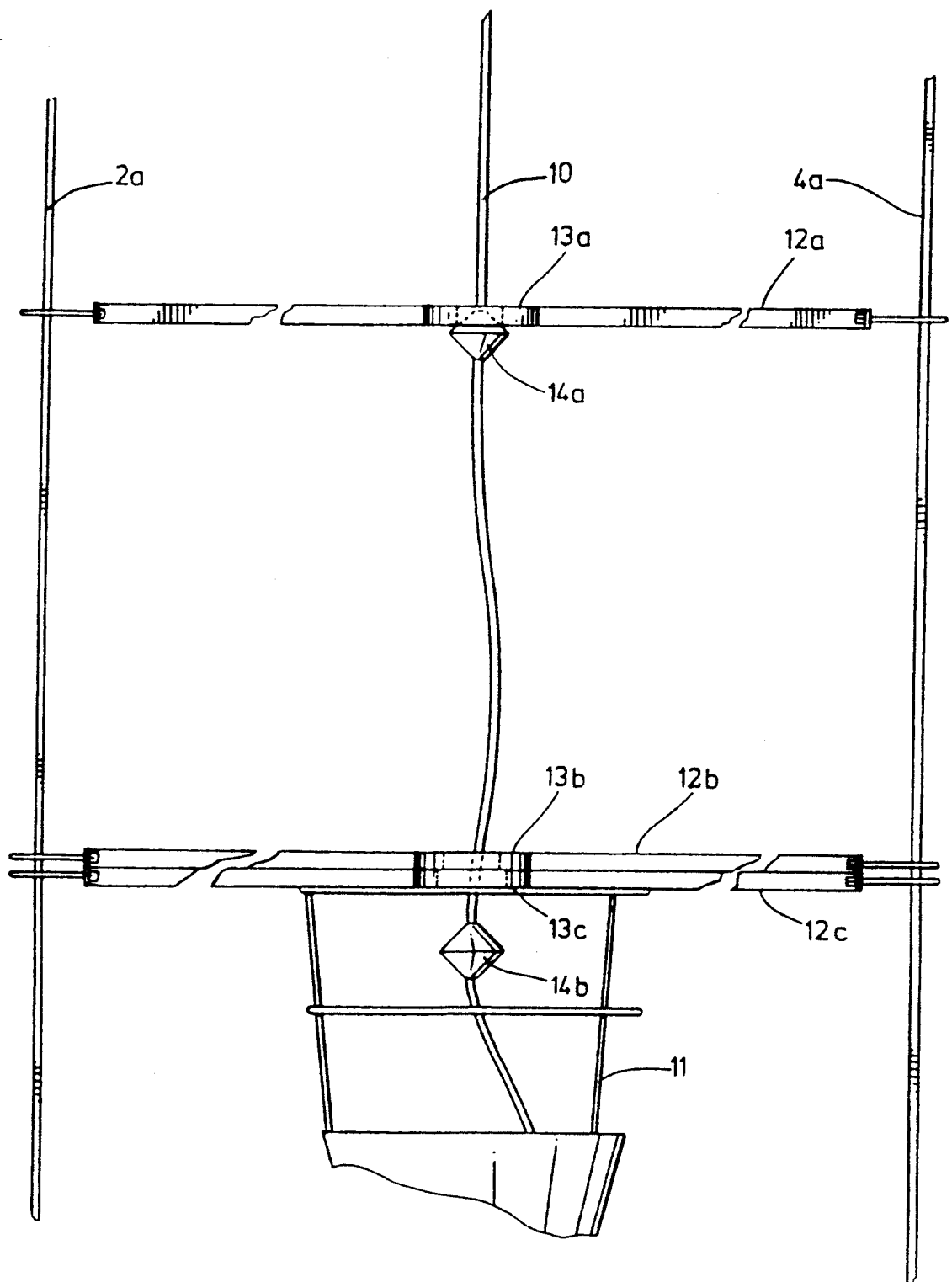
FIG. 3 shows a perspective side view of the cable guide according to the invention.

FIG. 3 shows the function of the cable guide. By way of example, three embodiments 12a, 12b, 12c of the bracket are shown, it being evident that the number of brackets may be more or less, but it is convenient to have one bracket 12 for every four meters of cable. These brackets 12a, 12b, 12c are arranged in the way decribed in FIG. 2.

The ring 13a of the uppermost bracket 12a has a relatively small diameter and the element 14a has in its largest part a somewhat larger diameter than the inner diameter of the ring 13a. The double conical form of the element 14 has the advantage that the element 14 easily can be guided into the right position in the corrsponding ring 13 and can easily pass through the rings 13 lying below. Thus, the inner diameter of the ring 13b is somewhat larger than the inner diameter of the ring 13a but somewhat smaller than the inner diameter of the ring 13c. Thus, the element 14a can pass through the rings 13b and 13c, but not through the ring 13a. The element 14b on its way up from the basket 11 can pass through the ring 13c but is stopped by the ring 13b and engages accordingly the bracket 12b guiding the cable during persistent hoisting. The distance between the elements 14a and 14b can be any suitable distance, but is, as mentioned before, preferably about four meters. A further element (not shown) follows the element 14b and is stopped by the ring 13c for bringing along the bracket 12c guiding the cable.

The result of this arrangement is that the cable 10 is guided by the brackets 12 in such a way that it keeps its position independent of its exposure to gusts. The hoisting cords 2a and 4a respectively are comparatively narrow and are tightly stretched between the derrick (not shown) and the heavy derrick bridle 1, with the consequence that these are not effected by gusts and also can sustain the cable 10 without being effected.

According to FIG. 3 the cable 10 falls down into the basket 11 through the rings 13 of the brackets 12 when the derrick bridle is hoisted, and as the elements 14 are increasing in size downwards from the top, as well as the inner diameter of the rings 13, the elements will fall all the way through and do not disturb the cable 10 being assembled in the basket 11. At the same time the brackets 12 are placed on top of each other on the upper side of the basket and are stored there until the bridle 1 is lowered, when a contrary action takes place, i.e. the elements 14 are stopped by the corresponding ring 13 and bring along a bracket 12 one at a time from the staple of brackets on top of the basket 11.

The brackets 12 as well as appertaining components are conveniently made of a lightweight material, e.g. reinforced plastics or light metal. Thus, the strain on the cable 10 becomes small but is sufficient to keep the cable adequately stretched so as not to be dislocated by gusts.

As one can see from the description above the problem mentioned previously is solved in an easy and efficient manner.

I claim:

1. Arrangement for hoisting devices to keep a cable means substantially vertically stretched between a derrick means and a hoisting device for handling containers, characterized in that a set of brackets (12a, 12b, 12c) is extended between and glidably fixed to two opposed hoisting cords (2a, 4a) which extend between the hoisting device and the derrick bridle, that the brackets (12) have a ring (13a, 13b, 13c) approximately at their centre, through which ring the cable (10) is running, that the cable (10) is equipped with a set of elements (14a, 14b) fixed to the cable (10) at a distance from each other, the elements having an increasing diameter for each element from the top downwards and that the rings (13a, 13b, 13c) on the brackets (12a, 12b, 12c) being placed on top of each other have an increasing inner diameter for each bracket from the top downwards so that each ring (13a, 13b, 13c) one by one is stopping the passage of a predetermined element (14a, 14b) through a top of a predetermined corresponding ring, whereby each element (14) at a hoisting of the cable (10) is lifting its corresponding bracket (12).

2. Arrangement according to claim 1, characterized in that the circumference of the corresponding rings (13) is coated with a wear material for reducing friction.

3. Arrangement according to claim 2, characterized in that each bracket (12) has an eye (15) at each of its uttermost ends which encircles one of the hoisting cords (2a, 4a).

4. Arrangement according to claim 3, characterized in that each eye (15) comprises a friction reducing material.

5. Arrangement according to claim 1, characterized in that each bracket (12) has an eye (15) at each of its uttermost ends which encircles one of the hoisting cords (2a, 4a).

6. Arrangement according to claim 5, characterized in that each eye (15) comprises a friction reducing material.

* * * * *